United States Patent
Baer

(10) Patent No.: US 10,228,257 B2
(45) Date of Patent: Mar. 12, 2019

(54) TOOL FOR ASSISTING USER IN FINDING A FAIR MEETING LOCATION

(71) Applicant: Microsoft Technology Licensing, LLC, Redmond, WA (US)

(72) Inventor: Matthias Christian F. Baer, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 87 days.

(21) Appl. No.: 15/363,430

(22) Filed: Nov. 29, 2016

(65) Prior Publication Data
US 2018/0149484 A1 May 31, 2018

(51) Int. Cl.
G01C 21/34 (2006.01)
G01C 21/36 (2006.01)

(52) U.S. Cl.
CPC ..... *G01C 21/3438* (2013.01); *G01C 21/3415* (2013.01); *G01C 21/3453* (2013.01); *G01C 21/3697* (2013.01)

(58) Field of Classification Search
CPC .................................................. G01C 21/3438
See application file for complete search history.

(56) References Cited

U.S. PATENT DOCUMENTS

| | | | |
|---|---|---|---|
| 6,622,084 B2 | 9/2003 | Cardno et al. | |
| 8,185,418 B2 | 5/2012 | de Marcken et al. | |
| 8,793,065 B2 | 7/2014 | Seltzer et al. | |
| 8,965,407 B2 * | 2/2015 | Dave | H04W 4/21 455/456.3 |
| 9,140,570 B1 | 9/2015 | Baird | |
| 9,354,071 B2 * | 5/2016 | Wicker | G01C 21/3415 |
| 9,558,457 B2 * | 1/2017 | V | G06Q 10/02 |
| 9,945,680 B1 * | 4/2018 | Kahn | H04W 4/023 |
| 2001/0044693 A1 | 11/2001 | Gotou et al. | |
| 2002/0022981 A1 | 2/2002 | Goldstein | |
| 2006/0111834 A1 | 5/2006 | Bouget et al. | |
| 2009/0055238 A1 | 2/2009 | Baryshnikov et al. | |
| 2009/0100037 A1 * | 4/2009 | Scheibe | G06F 17/3087 |

(Continued)

FOREIGN PATENT DOCUMENTS

| | | |
|---|---|---|
| WO | 2006085740 A1 | 8/2006 |
| WO | 2007007350 A2 | 1/2007 |

OTHER PUBLICATIONS

"MeetWays, Frequently Asked Questions," available at <<http://www.meetways.com/>>, accessed Apr. 28, 2016, 2 pages.

(Continued)

*Primary Examiner* — Anshul Sood
(74) *Attorney, Agent, or Firm* — Rainier Patents, P.S.

(57) ABSTRACT

A computer-implemented technique is described herein for assisting at least two users in finding and traveling to (and/or from) a meeting location. In one implementation, the technique generates and displays a heat map that shows at least one fair region having meeting locations that satisfy a fairness consideration. In one case, a meeting location within the fair region(s) satisfies the fairness consideration when the users can travel to (and/or from) the meeting location with an equal amount of cost. The heat map can also show one or more fairness-deficient regions that fail to satisfy the fairness consideration, relative to a specific user, with respect to one or more specified degrees of cost mismatch.

20 Claims, 12 Drawing Sheets

(56) References Cited

U.S. PATENT DOCUMENTS

| | | | |
|---|---|---|---|
| 2010/0076951 A1* | 3/2010 | Lyle | H04W 4/21 |
| | | | 707/706 |
| 2011/0113148 A1* | 5/2011 | Salmela | G01C 21/3438 |
| | | | 709/229 |
| 2014/0310266 A1 | 10/2014 | Greenfield | |
| 2015/0051829 A1 | 2/2015 | Gearhart et al. | |

OTHER PUBLICATIONS

"Let's Meet in the Middle," available at <<http://www.geomidpoint.com.meet/>>, accessed on Apr. 22, 2016, 2 pages.

* cited by examiner

INPUT CONDITIONS:
• HOW COST IS DEFINED: TRAVEL TIME
• TIME CONSTRAINT: WITHIN 30 MINUTES
• TRANSPORT: A AND B ARE BOTH PERSONAL AUTO

INPUT CONDITIONS:
- HOW COST IS DEFINED: TRAVEL TIME
- TIME CONSTRAINT: WITHIN 30 MINUTES
- TRANSPORT: A AND B ARE BOTH PERSONAL AUTO
- DESTINATION TYPE: COFFEE SHOP

INPUT CONDITIONS:
• HOW COST IS DEFINED: TRAVEL TIME
• TIME CONSTRAINT: WITHIN 30 MINUTES
• TRANSPORT: A AND B ARE BOTH PERSONAL AUTO

MAP PRESENTED TO
PERSON A: TIME z+5

INPUT CONDITIONS:
- HOW COST IS DEFINED: TRAVEL TIME AND APPROX. COST
- GEOGRAPHIC CONSTRAINT: UNITED STATES
- OTHER CONSTRAINT: 1 LEG JOURNEY
- TRANSPORT: PERSONAL AUTO OR COMMERCIAL AIRLINE

TOOL FOR ASSISTING USER IN FINDING A FAIR MEETING LOCATION

BACKGROUND

Users commonly use navigation tools for assistance in traveling to a target destination. For example, two users who wish to meet may examine respective instances of a digital map to manually identify a viable meeting location. The users may then use respective instances of a route-finding mechanism to guide them to the meeting location. However, the task of choosing a meeting location, and then traveling to that meeting location, is complex in nature; such a task is not adequately addressed by the above-described navigation tools. For instance, the users may choose a meeting location that appears to be geographically midway between their respective starting positions; but due to various factors, it may take one of the users longer to reach the meeting location than the other.

SUMMARY

A computer-implemented technique is described herein for assisting at least two users in finding and traveling to (and/or from) a meeting location. In one implementation, the technique includes an input phase that involves: receiving selection factors that specify setup conditions; and receiving position information that reflects the current positions of the first user and the second user. The technique then determines at least one fair region having meeting locations that satisfy a fairness consideration, based on the selection factors and the position information. In one case, a meeting location within the fair region(s) satisfies the fairness consideration when both the first user and the second user can travel to (and/or from) the meeting location with an equal amount of cost (e.g., travel time, financial cost, etc.). In other cases, another cost function can be selected which defines what is considered a fair meeting location in any other way. In some implementations, the technique then generates and provides graphical presentations of a first map and/or a second map, for respective consumption by the first and/or second users. Both the first map and the second map depict the identified fair region(s). The first and second users may consume the graphical presentations via respective user computing devices.

According to another illustrative aspect, the technique also determines one or more first fairness-deficient regions that fail to satisfy the fairness consideration relative to the first user, with respect to one or more specified degrees of cost mismatch. The technique also determines one or more second fairness-deficient regions that fail to satisfy the fairness consideration relative to the second user, with respect to one or more specified degrees of cost mismatch. The first map shows the first fairness-deficient region(s), while the second map shows the second fairness-deficient region(s). The maps simultaneously present the fairness-deficient region(s) with the fair region(s), or separately therefrom.

Overall, each of the first and second maps may take the form a graphical heat map. The first user and the second user may consult the maps as a visual aid in selecting a mutually acceptable meeting location. Moreover, in some implementations, the technique continually updates the maps as the users travel towards (or away from) a previously chosen meeting location; this capability provides the users with information regarding the current viability of the previously selected meeting location.

According to another illustrative aspect, the input phase can also involve receiving information regarding a desired destination characteristic, e.g., as when a user indicates that he or she wishes to meet a friend at a particular kind of establishment. The technique can identify meeting locations which match the specified destination characteristic within the map(s).

Among its advantages, the technique allows the users to select a meeting location in a user-efficient and resource-efficient manner, e.g., by forgoing an extended ad hoc manual interaction with digital maps. Further, in some implementations, the technique allows the users to advance toward (or away from) a previously selected meeting location in an efficient manner, e.g., by keeping the users continuously apprised of the viability of the meeting location in the course of their travels, which allows users to make corrections to account for changes in the fairness profile of a map region.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
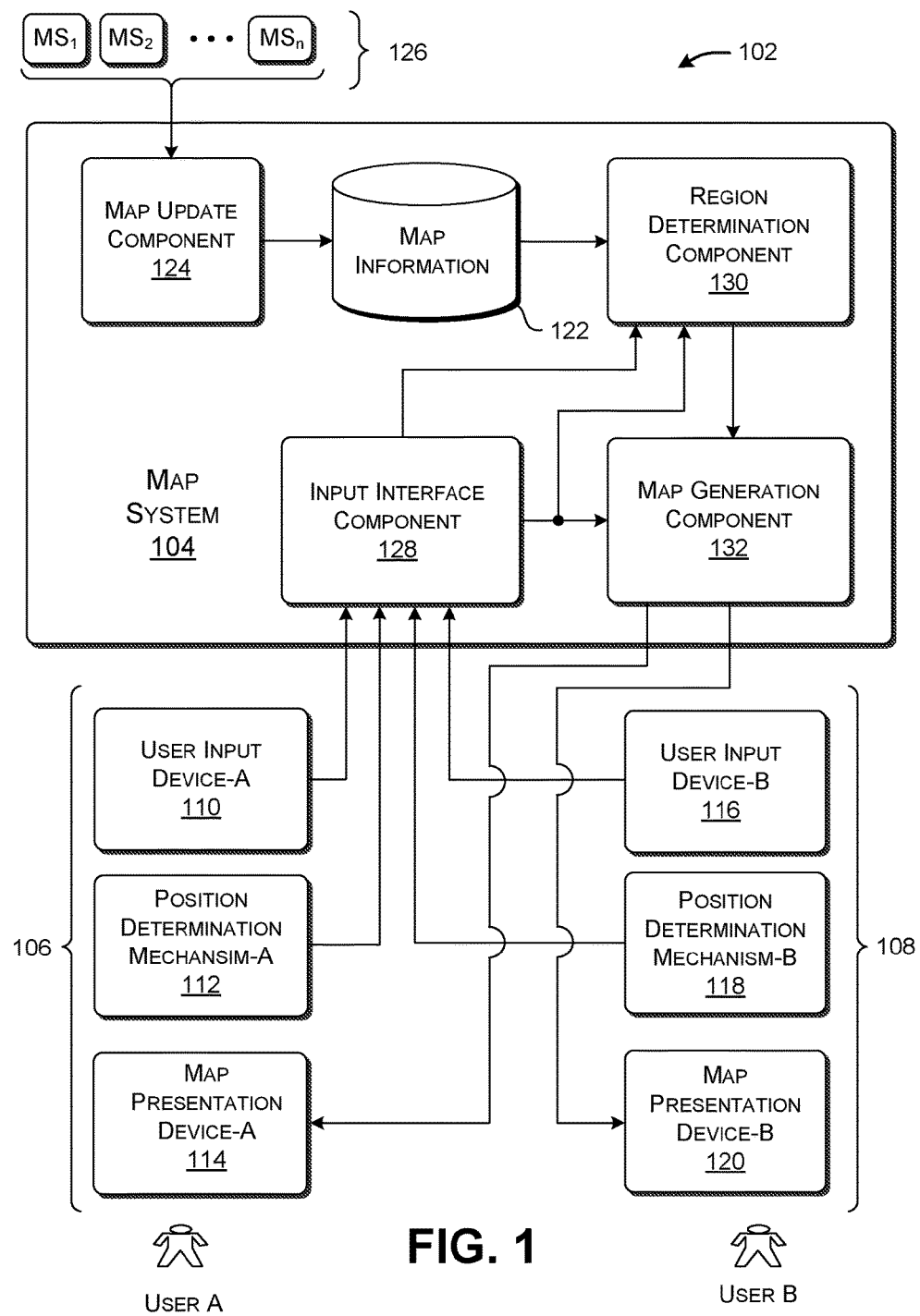
FIG. 1 shows an overview of an environment having a map system. The map system assists at least a first user and a second user in finding and traveling to an equitable meeting location.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computer-implemented system for assisting users in finding an equitable meeting location. Section B sets forth illustrative methods which explain the operation of the system of Section A. And Section C describes illustrative computing functionality that can be used to implement any aspect of the features described in Sections A and B.

As a preliminary matter, some of the figures describe concepts in the context of one or more structural components, also referred to as functionality, modules, features, elements, etc. In one implementation, the various components shown in the figures can be implemented by software running on computer equipment, or other logic hardware (e.g., FPGAs), etc., or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts can be implemented by software running on computer equipment, or other logic hardware (e.g., FPGAs), etc., or any combination thereof.

As to terminology, the phrase "configured to" encompasses various physical and tangible mechanisms for performing an identified operation. The mechanisms can be configured to perform an operation using, for instance, software running on computer equipment, or other logic hardware (e.g., FPGAs), etc., or any combination thereof.

The term "logic" encompasses various physical and tangible mechanisms for performing a task. For instance, each operation illustrated in the flowcharts corresponds to a logic component for performing that operation. An operation can be performed using, for instance, software running on computer equipment, or other logic hardware (e.g., FPGAs), etc., or any combination thereof. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

FIG. 1 shows an overview of an environment 102 having a map system 104. The map system 104 assists at least a first user ("user A") and a second user ("user B") in finding and traveling to (and/or from) an equitable meeting location. An equitable (or fair) meeting location is a meeting location that the first user and the second user can travel to (and/or from) with equal cost. More generally, an equitable meeting location is a meeting location that the first user and the second user can travel to (and/or from) with an amount of cost that satisfies a specified cost function. Cost can be defined with respect to any expendable resource, such as time, financial cost, physical exertion (e.g., with respect to walking or biking modes of transportation), etc., or combination thereof. Further, different use cases can define what constitutes "equal" with respect to any environment-specific tolerance. For instance, in one use case, two users can be said to reach a meeting location with equal cost when they arrive at the meeting location within 10 minutes of each other.

The map system 104 will be primarily described below in the illustrative context in which two users wish to find and travel to a fair meeting location, commencing from two different respective starting positions. But the map system 104 can also be applied to a case in which the two users start from the same meeting location and travel to respective established target destinations. In this case, the map system 104 assists the user in finding an equitable meeting location that will allow the users to reach their respective target destinations with equal cost (or with an amount of cost that satisfies some other cost function). In yet another case, the map system 104 can be applied to a case in which the two users start from the same meeting location, travel to respective established target destinations, and then return to the same meeting location. Here, the map system 104 assists the user in finding an equitable meeting location that will allow the users to complete their respective roundtrip journeys with equal cost (or with an amount of cost that satisfies some other cost function).

In other cases, the map system 104 can serve as a tool for finding a mutually fair meeting location for any number of people. For instance, the map system 104 can help a party organizer to find a location at which to hold a party that is most fair to all of the party attendees, as defined with respect to any cost function.

Further, the map system 104 can be applied to a geographic domain having any scope. For instance, the map system 104 can assist users in finding a fair meeting location within a neighborhood, city, state (province), country, continent, hemisphere, the entire world, etc. In another scenario, the map system 104 can help the users find a fair meeting location within any kind of campus or park that includes a collection of buildings, or even within a single building.

Moreover, the map system 104 can be applied regardless of the reason(s) that two or more people (or more generally, two or more entities) wish to find an equitable meeting location. In one use case, two friends may wish to find a fair meeting place to engage in some recreational activity, or just to enjoy each other's company. In another use case, two business entities may wish to find an equitable meeting place to fairly share the travel costs associated with some kind of business transaction. In another case, two business entities may wish to find a fair distribution point that will ensure that its products can be delivered to the greatest number of customers in the same amount of time, and so on.

In some implementations, a first user may interact with the map system 104 via first electronic equipment 106, while a second user may interact with map system 104 via second electronic equipment 108. The first electronic equipment 106 includes a first user input device 110, a first position determination mechanism 112, and a first map presentation device 114. Similarly, the second electronic equipment 108 includes a second user input device 116, a second position determination mechanism 118, and a second map presentation device 120. In other implementations described below, a single user can interact with the map system 104 via a single instance of electronic equipment.

In some implementations, the map presentation devices (114, 120) present graphical presentations to the first and second users. That is, the first map presentation device provides a graphical presentation to the first user which features a first map. The second map presentation device 120 provides a graphical presentation to the second user which features a second map. Later figures (and accompanying explanation) describe the first and second maps.

The user input devices (110, 116) receive input information from the users and forward the input information to the map system 104. That is, the users may interact with their user input devices (110, 116) to provide one or more selection factors. The selection factors describe setup conditions (described below) that influence the manner in which the map system 104 identifies fair meeting locations. The users may also use their user input devices (110, 116) to interact with the graphical presentations provided by the map system 104.

In some implementations, the position determination mechanisms (112, 118) provide position information regarding the current positions of the first user and the second user. In one implementation, each position determination mechanism is integrated into a user computing device that is carried by a user. In another implementation, each position determination mechanism is affixed to or otherwise associated with a vehicle that a user uses to travel to a meeting location. Alternatively, or in addition, the first user can manually enter at least his or her starting location via the user input device 110, and the second user can manually enter at least his or her starting location via the user input device 116. Or any user can enter plural starting locations; for instance, the first user can enter both his or her starting location and the second user's starting location.

Each user input device (110, 116) may correspond to any one of (or combination of): a key input device, a touch-sensitive screen mechanism, a voice control mechanism that relies of voice recognition, a free space gesture mechanism, and so on. Each position determination mechanism (112, 118) may correspond to any one of (or combination of): a Global Positioning System (GPS) mechanism, a triangulation mechanism, a signal proximity mechanism (which registers whether a user is within range of a wireless signal emitter or wireless signal receiver), a dead reckoning mechanism, and so on. Each map presentation device (114, 120) can correspond to any one of (or combination of): a charge-coupled display device, a cathode ray tube device, a projection mechanism, a printer, a voice-based system in conjunction with one or more speakers, a haptic output mechanism, an archival mechanism (for storing map information), and so on The map system 104 includes a data store 122 that provides digital map information. The digital map information provides a representation of a geographic region of any geographic scope. The digital map information can represent natural and manmade features in the region. In addition, the digital map information provides particularly rich information regarding travel routes through the region. For instance, the digital map information provides details on the location of the routes, the characteristics of the routes (e.g., the speed limits or other restrictions associated with the routes), the current statuses of the routes, and so on.

A map update component 124 updates the map information in the data store 122 on a periodic and/or event-driven basis. That is, the map update component 124 updates the map information on the basis of updates provided from one or more monitoring systems 126. For example, one such monitoring system can correspond to a computing system that provides information regarding the current traffic conditions of each route described in the map information. For instance, that monitoring system can notify the map update component 124 that there is traffic congestion on a particular route described by the map information. The map update system 124 can interact with the monitoring systems 126 using any interface technology, e.g., via one or more Application Programming Interfaces (APIs).

An input interface component 128 receives input information from the user input devices (110, 116) and the position determination mechanisms (112, 118). The input interface component 128 can use any interface technology to perform this task, such as one or more APIs. More specifically, the input interface component 128 can receive selection factors from one or more users, as supplied by one or more user input devices (110, 116). The input interface component 128 can also receive input signals from one or more users via the user input devices (110, 116); those input signals reflect the user(s) interaction with graphical presentations provided by the map system 104. The input interface component 128 can also receive position information from the position determination mechanisms (112, 118). The position information reflects the respective current positions of the first user and the second user. Alternatively, or in addition, the input interface component 128 can receive position information that one or more of the users manually provide via their respective user input devices (110, 116). For example, at least one user may manually specify that he or she is currently located at a particular intersection within a geographic region.

A region determination component 130 receives selection factors and position information from the input interface component 128. Based thereon, the region determination component 130 determines at least one fair region having meeting locations that satisfy a fairness consideration, based on the selection factors and the position information. In one case, a meeting location within the fair region(s) satisfies the fairness consideration when both the first user and the second user can travel to (and/or from) the meeting location with an equal amount of cost (e.g., travel time, financial cost, etc.). In a more general case, a meeting location is considered fair when the first user and the second user can travel to (and/or from) the meeting location with an amount of cost that satisfies a specified cost function, where equal cost expenditure is just one cost function among many.

In some implementations, the region determination component 130 also determines one or more first fairness-deficient regions that fail to satisfy the fairness consideration relative to the first user, with respect to one or more specified degrees of cost mismatch. The technique also determines one or more second fairness-deficient regions that fail to satisfy the fairness consideration relative to the second user, with respect to one or more specified degrees of cost mismatch.

A map generation component 132 then generates and provides graphical presentations that provide a first map and/or a second map, for respective consumption by the first and second users via first and second user computing devices. Both the first map and the second map depict the identified fairness region(s). The first map can also show the first fairness-deficient region(s) prepared for the first user, while the second map can show the second fairness-deficient region(s) prepared for the second user.

Overall, each of the first and second maps may take the from a graphical heat map. The first user and the second user may consult the maps as a visual aid in selecting a mutually acceptable meeting location. Moreover, in some implementations, the region determination component 130 and the map generation component 132 can continually update the maps as the users travel towards (or away from) a previously chosen meeting location, providing the users with information regarding the current viability of the previously selected meeting location.

FIG. 1 also indicates the region determination component 130 and map generation component 132 may receive an input signal from the input interface component 128. The input signal may reflect an instruction from a user as the user interacts with a graphical presentation. The region determination component 130 may react to the input signal (e.g., which may specify a new selection factor) by recalculating the fair region(s) and the fairness-deficient region(s) for one or more users. The map generation component 132 reacts to the input signal by displaying one or more updated graphical presentations.

Although not shown in FIG. 1, the map system 104 can also include any kind of route guidance component. The route guidance component provides instructions to each user as the user navigates through a region towards a specified meeting location. The route guidance component can use known techniques to perform this task, such as by computing the shortest path between a user's current position and the meeting location (e.g., using Dijkstra's algorithm), and then providing verbal and/or visual instructions which guide the user along the shortest path.

FIG. 1 has been described for an implementation in which both the first user and the second user operate as co-participants in providing input information and in subsequently interacting with output information (e.g., the graphical presentations provided by the map generation component 132). In another implementation, a single user may supply all of the selection factors. Further, the map generation component 132 can provide a single graphical presentation for consumption by that single user. The single user can correspond to a person who is planning to find a meeting location to meet another person. Or the single user can correspond to an administrative agent who is finding a fair meeting location on behalf of others who intend to meet.

Figure 2:
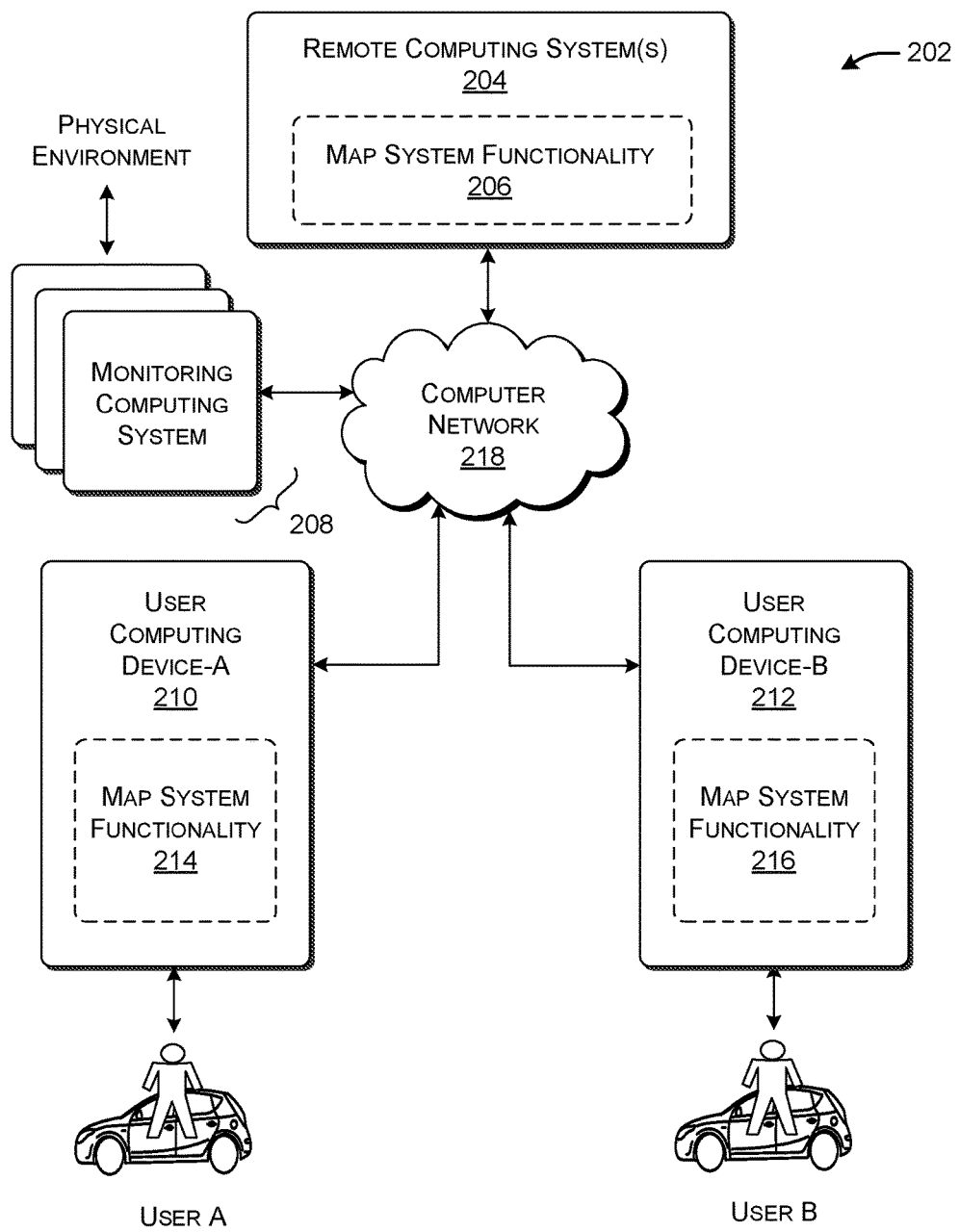
FIG. 2 shows computing equipment that can be used to implement the environment of FIG. 1.

FIG. 2 shows computing equipment 202 that can be used to implement the environment 102 of FIG. 1. The computing equipment 202 can include one or more remote computing systems 204. The remote computing system(s) 204 include mapping functionality 206 which implements at least some aspects of the map system 104 shown in FIG. 1. The computing equipment 202 can also include one or more monitoring computing systems 208 that implement the respective monitoring systems 126 of FIG. 1. Each computing system can include one or more server computing devices, one or more data stores, routers, firewall functionality, etc.

The computing equipment 202 also includes one or more first user computing devices 210 and one or more second user computing devices 212. Each user computing device(s) can include any of (or any combination of) a workstation computing device, a laptop computing device, any kind of handheld computing device (such as a smartphone), a wearable computing device, a vehicle-borne computing device, a game console, a set-top box device, a custom computing device designed to interact with the map system 104, etc. The first user computing device(s) 210 can implement the first user input device 110, the first position determination mechanism 112, and the first map presentation device 114. Similarly, the second user computing device(s) 212 can implement any of the second user input device 116, the second position determination mechanism 118, and the second map presentation device 120.

Each instance of the user computing device(s) can optionally handle any function that was described above and attributed to the map system 104. To illustrate this point, FIG. 1 shows that the first user computing device(s) 210 can include map functionality 214, while the second user computing device(s) 212 can include map functionality 216.

More specifically, in one implementation, the functions of the map system 104 are solely implemented by the remote computing system(s) 204. In another implementation, the functions of the map system 104 can be implemented in distributed fashion by the remote computing system(s) 204 and one or more instances of the user computing devices (210, 212). In another implementation, the functions of the map system 104 are entirely implemented in local fashion by one or more instances of the user computing devices (210, 212).

A computer network 218 communicatively couples the above-described components together. The computer network 218 may correspond to a wide area network (e.g., the Internet), a local area network, one or more point to point links, or any combination thereof.

Figure 3:
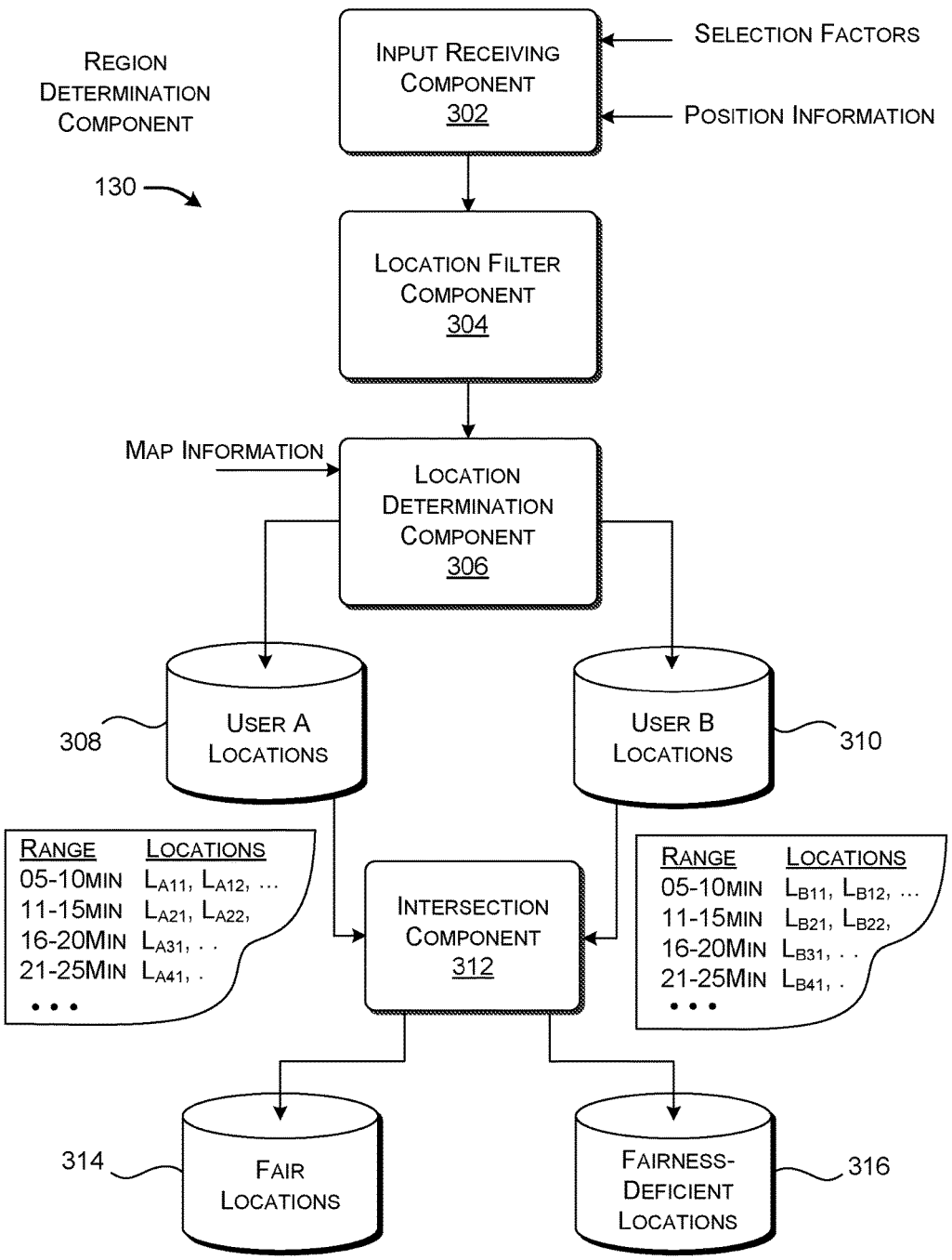
FIG. 3 shows one implementation of a region determination component, which is an element of the map system of FIG. 1.

FIG. 3 shows one implementation of the region determination component 130. As explained above, the overall purpose of the region determination component 130 is to identify one or more regions which having meeting locations that are considered fair, with respect to any fairness consideration, and optionally one or more fairness-deficient regions.

An input receiving component 302 receives selection factors from one or more users who intend to meet for any reason(s). Alternatively, the input receiving component 302 can receive the selection factors from an administrative user who is coordinating the meeting on behalf of the people who intend to meet. The selection factors generally specify setup conditions (such as constraints) that govern the manner in which the region determination component 130 computes the fair region(s) and fairness-deficient region(s). The selection factors can include any combination of the following parameters.

Meeting location type. A meeting location type selection factor defines a nature of the meeting location to be identified. In one case, the meeting location type specifies that the meeting location represents the target destination of the users, which the users travel to by starting from respective starting locations. In another case, the meeting location type specifies that the meeting location represents the starting point at which the users intend to embark for respective known target destinations.

Cost characteristic. A cost characteristic selection factor defines the nature of cost by which fairness is gauged. For instance, the cost characteristic can define cost in terms of an amount of time required to travel from a starting location to a meeting location. Alternatively, or in addition, the cost characteristic can define cost as the financial expense that it takes to travel from a starting location to a meeting location. Alternatively, or in addition, the cost characteristics can define cost in terms of physical exertion required to travel to a meeting location, where, for example, it takes more energy to travel up a hill than down the hill. Alternatively, or in addition, the cost characteristic can define cost with respect to amount of fuel consumed in traveling to a meeting location. Alternatively, or in addition, the cost characteristic can define cost in terms of the amount of vehicular wear-and-tear incurred in traveling to a meeting location. Alternatively, or in addition, the cost characteristic can define cost with respect to the amount of emissions (e.g., $CO_2$) released in the course of traveling to the meeting location, and so on.

Cost function. A cost function selection factor defines a paradigm for defining what constitutes a fair meeting location with respect to cost, in whatever manner cost is defined. For example, with respect to the task of planning a meeting to be attended by a group of three or more people, the cost function can specify that the best meeting location is one in which the most people can reach the meeting location in an equal amount of time. Another cost function can specify that the best meeting location is one that results in the smallest standard deviation in the time that is required to reach the meeting location, regardless of whether the travel times are otherwise equal. Another cost function can specify that the best meeting location is one that minimizes the total travel cost (e.g., travel time) among the meeting attendees, and so on. However, to simplify and facilitate explanation, the remainder of this Detailed Description section will emphasize the example in which a fair meeting location (meaning a meeting location that satisfies a fairness consideration) is one in which the users can reach with an equal amount of cost, in whatever manner cost is defined.

Starting time. A starting time selection factor defines a time at which one or more users plan to commence their travel to (or from) the meeting location.

Starting location(s). A starting location selection defines a location at which at least one user plans to depart to reach the meeting location. As a default, the region determination component 130 will interpret the current position of the user (as revealed by an associated position determination mechanism) as the starting location.

Maximum allotted time. A maximum allotted time selection factor defines an amount of time that the first user and/or the second user are willing to spend in traveling to reach the meeting location. Or the maximum allotted time can specify an amount of time the user(s) are willing to spend in traveling from a meeting location to respective target destinations.

Geographical scope. A geographical scope selection factor defines the bounds of a geographical area within which a viable meeting location can occur. A user can specify a geographical scope in any manner, e.g., by specifying a city, state, country, etc. Or the user can specify the geographical scope as the sweep of a radius of a specified length, with respect to a specified center reference location. The reference location may correspond, for instance, to a starting location or a midway point between starting locations.

Transportation mode. A transportation mode selection factor defines a one or more modes of transportation that a user plans to use in traveling to (or from) the meeting location. Transportation modes include, but are not limited to, personal automobile bus, train, subway, chauffer service of any kind (e.g., provided by a taxi company, a fleet of personal use vehicles, etc.), ride-sharing service, airplane, boat, walking, bicycle, etc., or any combination thereof.

Destination characteristic. A destination characteristic selection factor defines a characteristic of a meeting location at which the users plan to meet. For example, a destination characteristic can specify that the users intend to meeting at a park, a coffee shop, a restaurant, etc. Any such destination can be defined with any degree of specificity, e.g., by specifying a type of meeting location or the identity of a specific meeting location.

Multi-leg preference. A multi-leg preference selection factor defines at least one user's preference as to how a journey to (or from) a meeting location is to be partitioned into multiple segments, if at all. For example, a multi-leg preference may define a number of segments. Alternatively, or in addition, the multi-leg preference may define a maximum travel time associated with each segment. Alternatively, or in addition, the multi-leg preference may define a desired destination characteristic associated with each segment terminus, and so on. For instance, a user may specify that he or she prefers that a segment ends near a city having lodging.

Other preferences. Other preference selector factors can define any other user constraints. Generally, for example, a user can specify that a selected route to a candidate meeting location should preferably include certain characteristics and/or avoid other characteristics. For instance, a user can specify a preference for or against the use of high-speed highways, a preference for or against toll roads, a preference for or against ferries, a preference for or against mountain passes, a preference for or against bridges, tunnels, etc.

The selection factors set forth above are described by way of example, not limitation. Other implementations can accommodate additional selection factors and/or can eliminate one or more selection factors described above.

A location filter component 304 defines an initial set of positions that can be considered candidate meeting locations for consideration. Overall, the location filter component 304 helps reduce the amount of candidate locations to be processed, which expedites the processing performed by the region determination component 130, and reduces its associated consumption of computing resources.

The location filter component 304 operates by first excluding one or more general regions that cannot possibly host a viable meeting location in view of the selection factors that have been supplied by the input receiving component 302. For example, assume that a selection factor specifies that travel time cannot exceed one hour. Further assume that another selection factor specifies that the users intend to use their personal automobiles to travel to the meeting location, starting from respective starting locations. The location filter component 304 will exclude any candidate location that at least one user cannot reach within an hour using his or her personal automobile, subject to current traffic constraints (e.g., posted speed limits, prevailing traffic conditions, etc.).

Having broadly defined at least one viable region at which a meeting can take place, the location filter component 304 identifies individual candidate meeting locations within this general region. The location filter component 304 can perform this task in different ways. In one case, assume that the users are traveling by car (rather than, say, walking). In that case, the location filter component 304 can identify all points within a prescribed proximity to a roadway as viable candidate meeting locations, and all points outside this range as non-viable meeting locations. Further, the location filter component 304 can define viable locations with respect to any user-specified or administrator-specified level of granularity. For example, the location filter component 304 can select candidate locations along the course of a roadway that are separated by one mile. Alternatively, or in addition, the location filter component 304 can identify all points defined by the intersection of two or more roadways as viable candidate meeting locations.

Alternatively, or in addition, the location filter component 304 can identify all points that meet a specified destination characteristic within a general region. For example, assume that two users intend to meet at a coffee shop within the city of Seattle. Here, the location filter component 304 can select candidate locations that correspond to the known positions of coffee shops within the city of Seattle. In another implementation, the filter component 304 can expand the number of candidate locations if the number of coffee shops does not satisfy an environment-specific threshold. For example, the filter component 304 can expand the candidate locations to include any kind of restaurant in Seattle, or any kind of public establishment in the city of Seattle. By doing so, the map system 104 can present enough information by which the users can visually gauge the general contours of the fairness region(s) and the fairness-deficient region(s).

A location determination component 306 determines locations, selected from the candidate locations identified by the location filter component 304, that are reachable by each user with respect to different ranges of cost expenditure. For example, the location determination component 306 can determine a subset of locations that the first user can reach within 5-10 minutes, a subset of locations that the first user can reach within 11-15 minutes, a subset of locations that the first user can reach within 16-20 minutes, and so on. The location determination component 306 performs the same operation with respect to the second user. The location determination component 306 stores information regarding the first user's reachable locations in a first data store 308, and stores information regarding the second user's reachable locations in a second data store 310.

The location determination component 306 can compute the amount of time (or other cost) that is required to travel from a starting location to a target destination by finding a shortest path through an undirected and/or directed graph that represents candidate travel routes. The location determination component 306 can perform this computation using any route-finding algorithm, such as, but not limited to, Dijkstra's algorithm, the A* search algorithm, the Bellman-Ford algorithm, the Floyd-Warshall algorithm, the Viterbi algorithm, etc.

Assume that the cost function indicates that the goal is to select a meeting location that the users can reach with equal cost. In that case, an intersection component 312 forms an intersection of the first user's reachable locations and the second user's reachable locations to provide a set of fair meeting locations. The set of fair meeting locations defines at least one fair region. The set of fair meeting locations can be further partitioned into meeting locations that can be reached within given ranges of cost expenditure. For instance, the set of viable meeting locations can include a subset of meeting locations that can be reached by both users in 11-15 minutes, a subset of meeting locations that can be reached by both users in 16-20 minutes, and so on.

The intersection component 312 can also form one or more intersections to define at least one fairness-deficient region. For instance, the intersection component 312 can determine a set of meeting locations that a first user can reach if that user travels five more minutes compared to a second user. To perform this task, the intersection component 312 can form an intersection of: (a) locations that the first user can reach in x+5 minutes, with (b) locations that the second user can reach in x minutes, with respect to one or more values of x.

The intersection component 312 stores information regarding the fair region(s) in a first data store 314. The fair region(s) are the same for all users. The intersection component 312 stores information regarding per-user fairness-deficient regions(s) in a data store 316. What is considered unfair will vary from user to user.

In other cases, the selected cost function can indicate that a fair meeting location is one that satisfies a fairness consideration other than per-user equal cost expenditure. Here, the region determination component 130 can call on another processing unit besides (or in addition to) the intersection component 312 to find the fair region(s) and the fairness-deficient region(s). For instance, another processing unit can identify meeting locations that three or more users can reach with the lowest net cost expenditure, in whatever manner cost is defined. That processing unit can perform this task by: (a) enumerating different combinations of cost expenditure for the users (e.g., on the granularity of the cost ranges computed by the location determination component 306); (b) intersecting the ranges associated with each combination to find meeting locations, if any; and (c) choosing the combination that has lowest net cost expenditure and which has an intersection that yields non-zero results. Here, "fair" is defined in terms of the greatest possible good. For instance, the region determination component 130 may find that the best meeting locations are the ones in which nine of ten meeting participants expend 16-20 minutes in traveling to a meeting location, while the tenth meeting participant is asked to travel 41-45 minutes to the meeting location.

In the above alternative example, the region determination component 130 can compute a first fairness-deficient region that describes locations that the users can reach with a second-best range of net cost (if any), a second fairness-deficient region that describes locations that the users can reach with a third-best range of net cost (if any), and so on. In this case, "fair" is defined with respect to the greatest possible good, so the fairness-deficient region(s), like the fair region(s), will be the same for each user. In addition, or alternatively, the region determination component 130 and the map generation component 132 can give each user information regarding how their individual cost expenditure compares to other users' cost expenditures.

Figure 4:
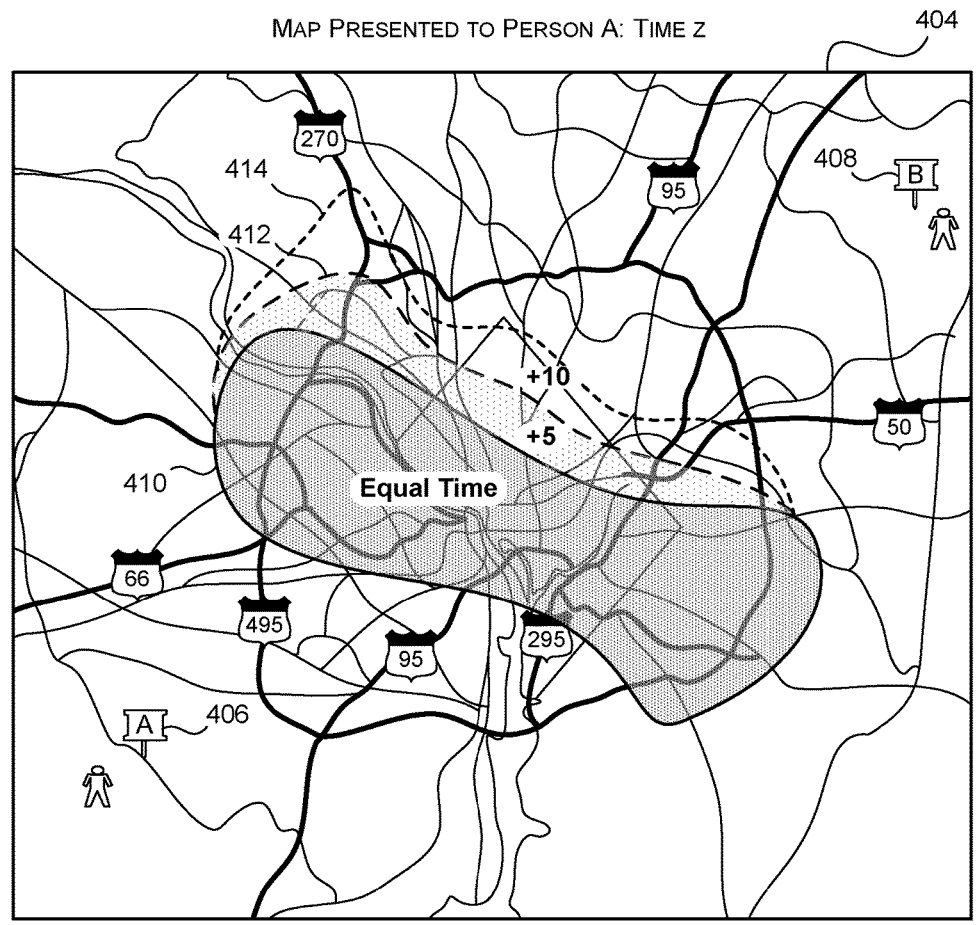
FIGS. 4-9 show graphical presentations generated by the map system of FIG. 1 in different respective circumstances.

FIG. 4 shows a graphical presentation 402 that shows a first map 404 presented to a first user at a time z. The region determination component 130 and the map generation component 132 generate the first map 404 given a first selection factor that specifies that cost is to be defined in terms of travel time, a second selection factor that specifies that the maximum travel time is not to exceed 30 minutes for any user, a third selection factor that specifies that the maximum geographical distance of the meeting location from either the current position of the first user or the current position of the second user is not to exceed 100 miles, and a fourth selection factor that specifies that both users will be traveling by personal automobiles. Although not shown, assume that a cost function is selected which indicates that a fair meeting location is a location that the users can reach with an equal amount of cost.

In one scenario, a single user (or an administrative user) defines all of the selection factors. In another scenario, both users collaboratively define the selection factors. In the latter scenario, each user can define a user-specific set of selection factors. In response, the map system 104 aggregates the selections factors and honors all of the selection factors. For instance, the first user can define his or her mode of transportation, while the second user can define his or her mode of transportation, where the first user's mode of transportation can be the same as or different from the second user's mode of transportation. In the case of a conflict (e.g., when the first user specifies that maximum travel time is not to exceed 20 minutes, and the second user specifies that the maximum travel time is not to exceed 30 minutes), the map system 104 can adopt the most constraining version of a selection factor (e.g., by choosing the selection factor that indicates that the maximum travel time is not to exceed 20 minutes). In other cases, the map system 104 can honor conflicting constraints on a per-person basis. For example, again consider the case in which the first user is willing to drive 20 minutes, while the second user is willing to drive 30 minutes. The map system 104 can show a fair region to both users in which no meeting location is accessible outside the bounds of 20 minutes. But the map system 104 can show fairness-deficient region(s) to the first user that are constrained by the first user's 20 minute limit, and show fairness-deficient region(s) to the second user that are constrained by the second user's 30 minute limit.

The first map 404 shows a first visual icon 406 that indicates a current location of the first user and a second visual icon 408 that indicates a current location of the second user. The current locations of the first user and the second user can be determined based on position information provided by the position determination mechanisms (112, 118), and/or based on position information manually input by the users.

The first map 404 also shows a graphical representation of a fair region 410. Although not shown, the first map 404 can alternatively partition the fair region 410 so that it includes plural fair sub-regions. Each fair sub-region corresponds to meeting locations that the users can access in a mutually fair amount of cost with respect to a particular range of costs. For instance, a first fair sub-region can include meeting locations that can be reached in less in 0-20 minutes, a second fair sub-region can include meeting locations that can be reached in 21-25 minutes, a third fair sub-region can include meeting locations that can be reached in 26-30 minutes, and so on.

The first map 404 also shows a graphical representation of a fairness-deficient region 412 that the first user can reach given five minutes of extra travel time compared to the second user. The first map 404 also shows a graphical representation of another fairness-deficient region 414 that the first user can reach given 10 minutes of extra travel time compared to the second user, and so on. The first map 404 can present the different respective regions with different respective colors and/or can assign other distinguishing visual attributes to the different regions. Alternatively, or in addition, the first map 404 can show the different regions by marking their respective borders.

The graphical presentation 402 can also include a section 416 that allows the first user to specify one or more selection factors. The graphical presentation 402 can also include a section 418 that allows the first user to dynamically vary at least one selection factor. In response to the user's interaction with the section 418, the region determination component 130 and the map generation component 132 dynamically change the contours of the various regions. For example, the user can dynamically modify a maximum time parameter to investigate what locations can be reached with a mutually fair amount of cost, for different maximum time parameters.

Although not shown, the graphical presentation 402 can also allow the user to control the manner in which the map system 104 presents the various regions. For example, the graphical presentation 402 can include a control mechanism by which the user can select the number of regions that are presented (e.g., by selecting the cost-related ranges associated with the regions), a control mechanism by which the user can select the manner by which the regions are visually demarcated, and so on.

Further note that, in some cases, the map system 104 will determine that there is no fair region 410 that meets all of the specified selection factors. In that case, the map system 104 can display just the fairness-deficient region(s) (412, 414), if any. A user may respond to a map that omits one or more of the regions (410, 412, 414) by choosing more liberal/permissive selection factors.

Figure 5:
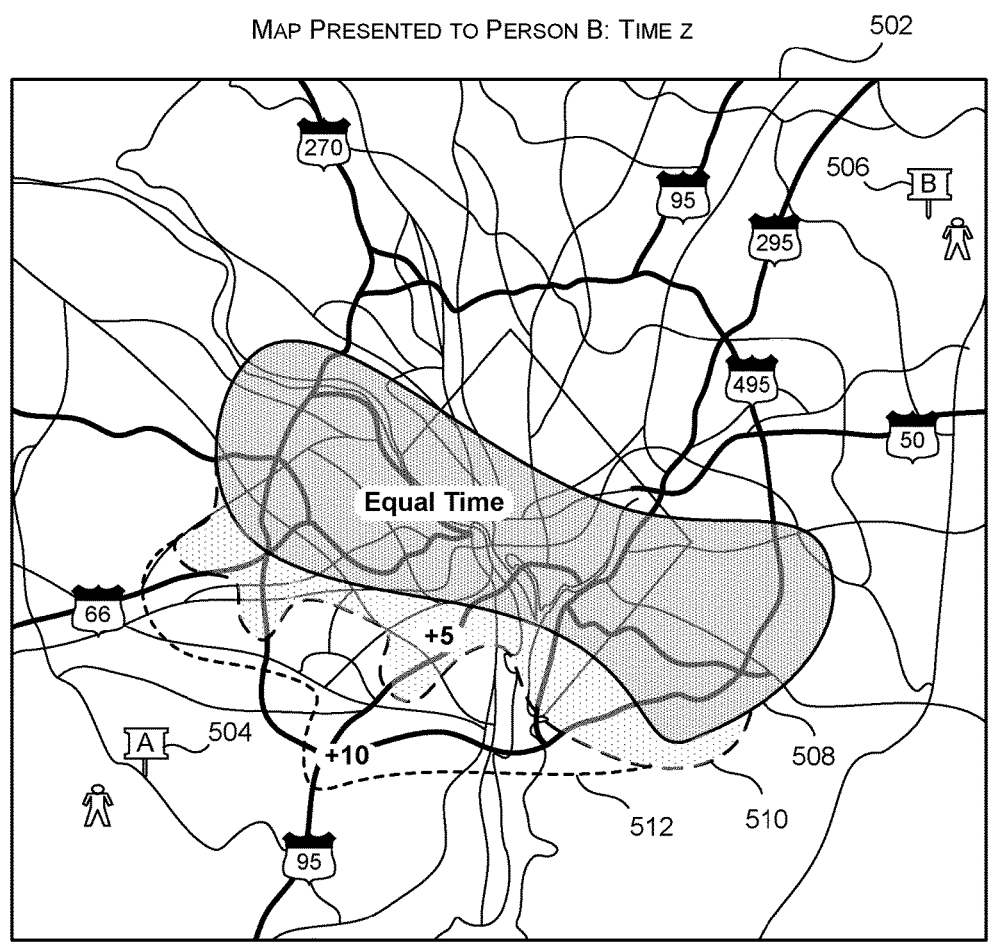

FIG. 5 shows a second map 502 presented at time z to a second user who seeks to meet the first user. Like the first map 404 of FIG. 4, the second map 502 shows visual icons (504, 506) that represent the current locations of the first user and the second user. The second map 502 also shows the same graphical representation of the fair region 508. Again, the fair region 508 defines meeting locations that the first and second user can reach in the same amount of cost, given the specified selection factors.

FIG. 5 differs from FIG. 4 by showing graphical representations of two fairness-deficient regions (510, 512) in which fairness is now gauged from the perspective of second user, rather than the first user. Although not shown, the map system 104 can also allow the second user to see the first map 404 presented to the second user, and vice versa. The second user can examine the first map 404 to gain insight regarding locations that are considered unfair from the perspective of the first user, which, in turn, can facilitate the ability of the two users in identifying a compromise meeting location.

Although not shown, any graphical presentation can incorporate messaging functionality that allows the users to communicate with each other. For example, any graphical presentation can include a control feature by which the users may send text messages, voice messages, video message, etc. to each other. For instance, the map system 104 can integrate with the SKYPE communication application provided by MICROSOFT CORPORATION of Redmond, Wash., e.g., through one or more APIs.

Figure 6:
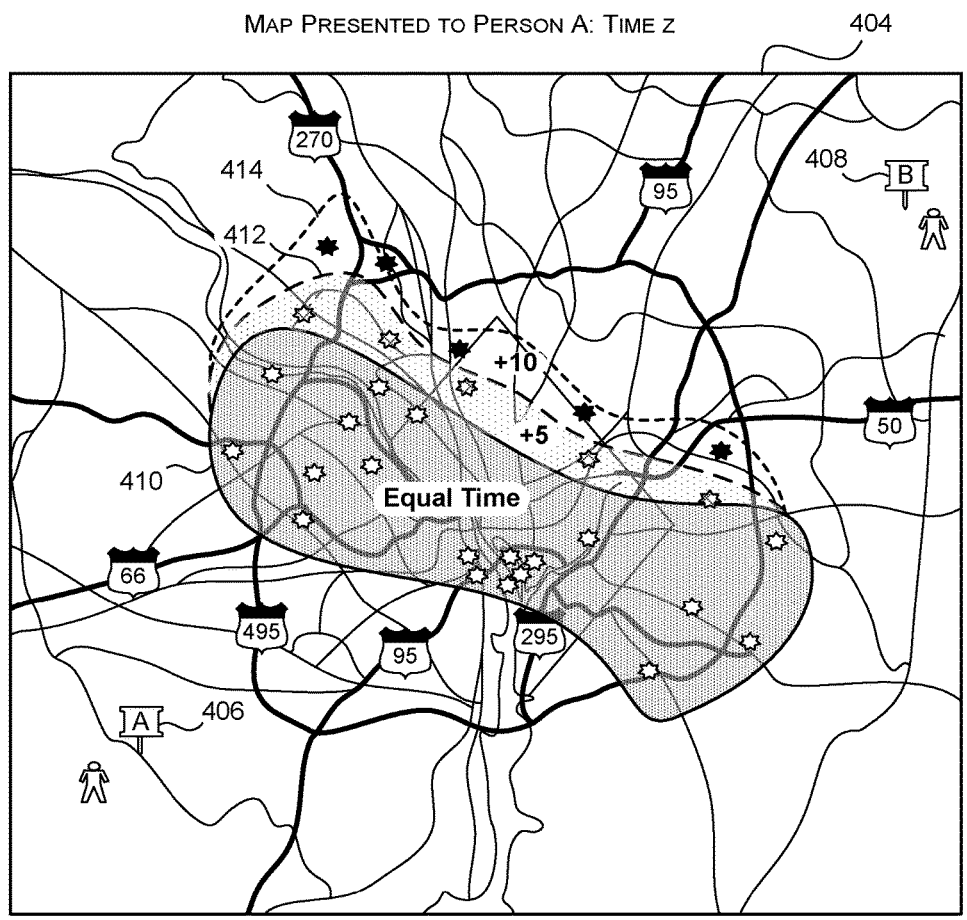

FIG. 6 shows the same first map 404 as FIG. 4, as presented to the first user. In the scenario of FIG. 6, however, the users have also supplied a selection factor that indicates that they are interested in meeting at a coffee shop. In response to this selection factor, the first map 404 displays the same regions (410, 412, 414) as before. But here, the first map 404 overlays visual icons (here, star symbols) which show the locations of coffee shops. The map generation component 132 can optionally omit any region that lacks any coffee shops within its boundaries. In addition, the first map 404 can optionally display different icons within different respective regions. For example, the first map 404 can show white stars within the fair region 410, gray stars within a first fairness-deficient region 412, and black stars within the second fairness-deficient region 414.

In an alternative case, the map generation component 132 can designate the different regions by showing the different kinds of visual icons mentioned above, that is, without also assigning a different background color or other visual attribute to the regions in general. That is, the user who interacts with the map will understand the bounds of a particular region based on the distribution of visual icons within it. In yet another implementation, the map generation component 132 can use the visual icons to demarcate the regions (without other indicators) only when the quantity of visual icons exceeds a prescribed environment-specific threshold. The map system 104 also empowers the end user to dynamically modify a map that is presented to him or her, e.g., by toggling certain display features on and off.

Figure 7:
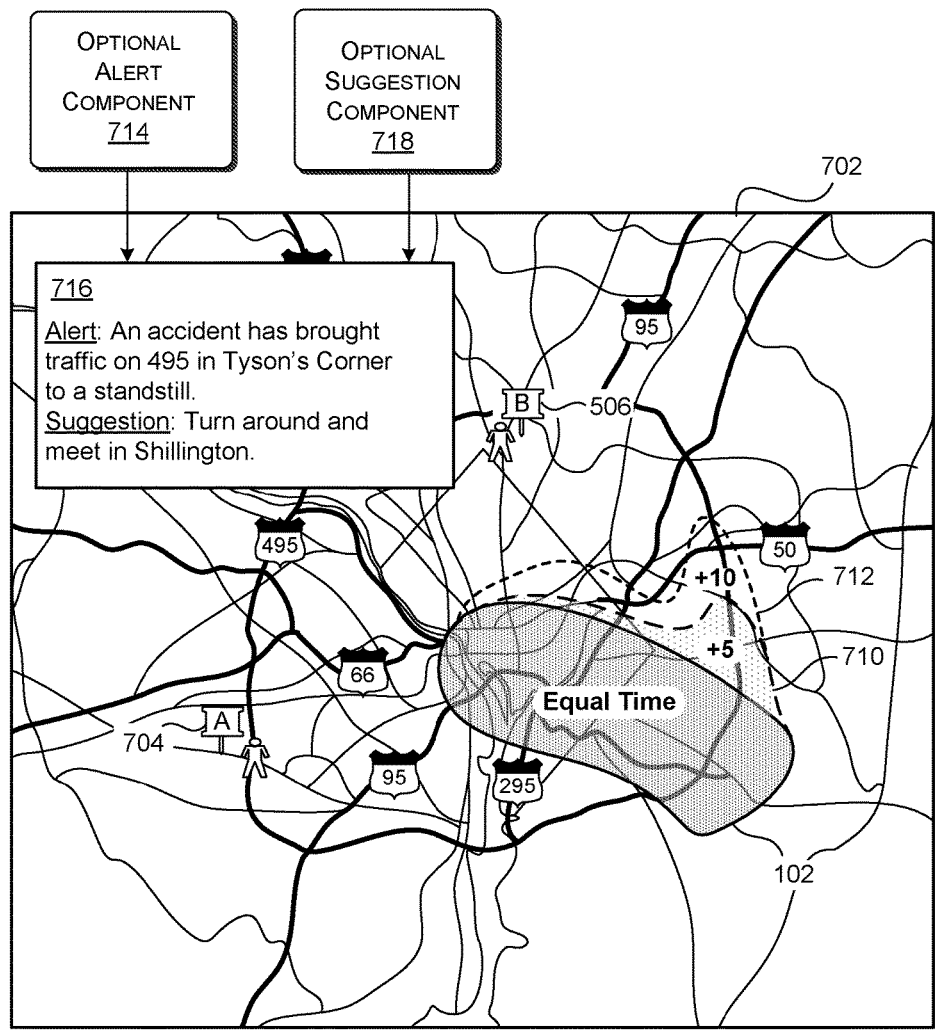

FIG. 7 shows a first map 702 presented to a first user at time z+15 minutes. By this time, the first user and the second user have agreed to meet at a fair location in Tysons Corner, Va. A first visual icon 704 shows the current position of the first user, while a second visual icon 706 shows the current position of the second user. The map system 104 can determine the current positions of the users based on position information automatically supplied by the position determination mechanisms (112, 118), and/or based on position information manually supplied by the users via the user input devices (110, 116).

Assume at this juncture that the map system 104 determines that an accident has occurred that will result in difficulty reaching the planned meeting location within the allotted time. The map system 104 can determine that such an event has occurred based on information providing by a monitoring system. In response, the region determination component 130 computes new regions (708, 710, 712), and the map generation component 132 displays updated graphical presentations that show the new regions (708, 710, 712). Note that, because of the impediment caused by the accident, the viable regions (708, 710, 712) at which a meeting location have shrunk relative to the counterpart regions (410, 412, 414) at time z in FIG. 4.

An optional alert component 714 (provided by the map system 104) can also send an alert message 716 to the users which alerts the users to the traffic condition that is affecting their travel plans. The alert component 714 can present the alert message in visual form, audio form, video form, haptic form, etc., or any combination thereof.

An optional suggestion component 718 (provided by the map system 104) can present a suggestion to the users regarding how the users might modify their travel plans to accommodate the change in traffic positions. For example, in the case of FIG. 7, the suggestion component 718 can present a suggestion which invites the users to turn around (with respect to their current direction of travel) and meet in another general area (e.g., Shirlington, Va.). The suggestion component 718 can present the alert message in visual form, audio form, video form, haptic form, etc., or any combination thereof. The suggestion component 718 can provide its recommendation using any technology, such as by using a rule-based system in conjunction with a data store of predetermined scripts. In addition, or alternatively, the suggestion component 718 can use a machine learned statistical model to generate its suggestions, e.g., by using a recurrent neural network to map input conditions into a recommendation.

Figure 8:
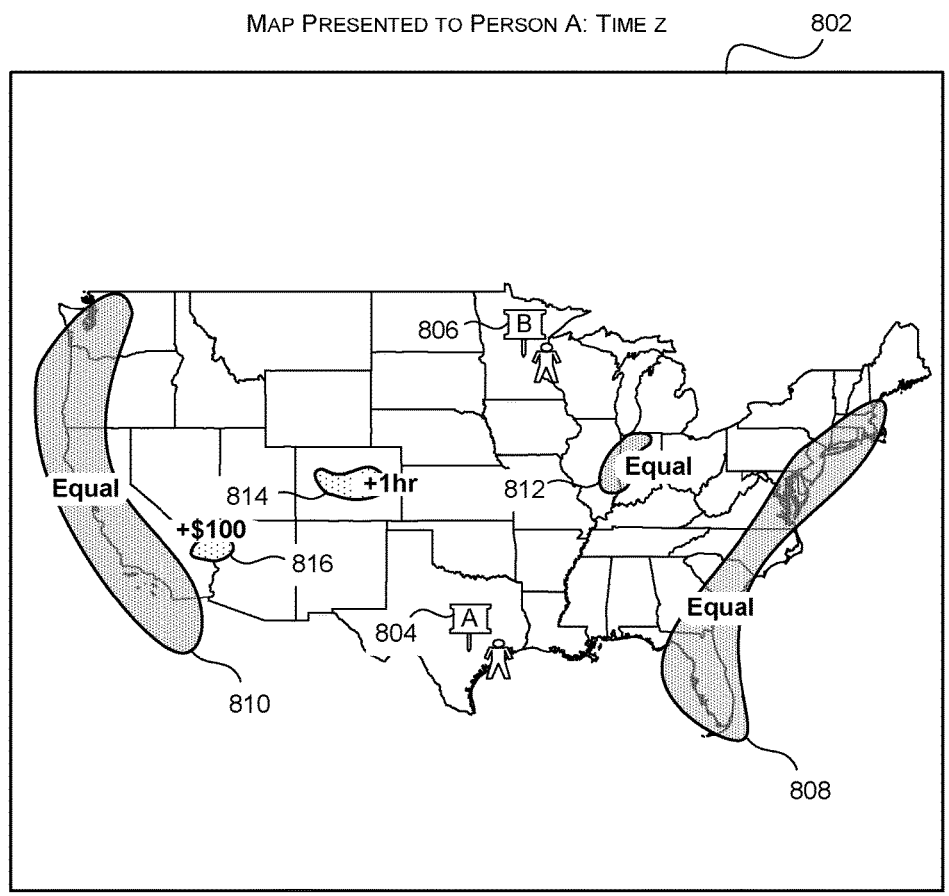

FIG. 8 shows another kind of first map 802 presented to a first user at time z. In this case, one selection factor indicates that the cost is defined by a combination of travel time and financial cost. Another selection factor indicates that the range of viable meeting locations is restricted to the entire lower 48 (contiguous continental) states of the United States of America. Another selection factor indicates that the users plan to travel to the meeting location via commercial airline and/or personal automobile. Another selection factor indicates that any flight that a user takes shall be limited to a one-leg flight (that is, with no intermediate stops). Assume again that a cost function is chosen that indicates that a fair meeting location is one that involves equal cost expenditure by the users.

As before, the first map 802 presents visual icons (804, 806) that show the current locations of the first and second users. The first map 802 also shows three geographically disjoint (discontinuous) fair regions (808, 810, 812) that both users can reach with equal amount of time and equal amount of financial expenditure. The first map 802 also shows a fairness-deficient region 814 having meeting locations that the first user can reach by spending one more hour of travel time compared to the second user. The first map 802 also shows a fairness-deficient region 816 having meeting locations that the second user can reach by spending $100 extra dollars compared to the second user.

More generally, FIG. 8 emphasizes the point that the map system 104 can be applied with respect to many different combinations of selection factors and for a geographical region of any scope (including the entire world). As noted above, the map system 104 can also be used to select a meeting location for three or more users. In yet other cases, the map system 104 can be applied to the case in which the meeting location defines the start of the users' journeys. Here, the map system 104 finds those meeting locations that allow the users to reach respective target destinations with an equal expenditure of cost.

Figure 9:
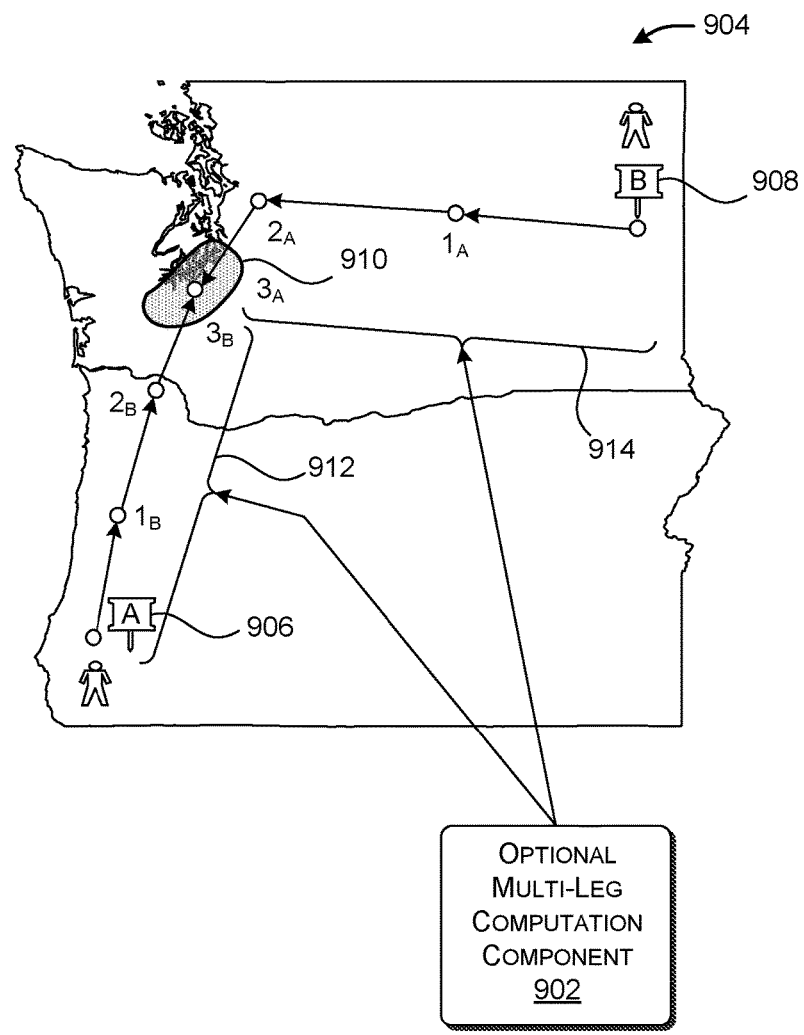

FIG. 9 shows an optional multi-leg computation component 902, which is another part of the map system 104 (although not shown in FIG. 1). The multi-leg computation component 902 breaks each user's journey into two or more segments, if desired by each user. The multi-leg computation component 902 performs this task based on selection factors specified by each user. For instance, both users in the example of FIG. 8 have specified that they wish their trips broken into three segments.

The multi-leg computation component 902 can break a user's journey into multiple segments by first dividing the total travel time associated with the complete journey into g number of time segments, where g is specified by the user (or in some cases, automatically suggested by the multi-leg component 902 based on a predetermined rule). The temporal endpoint of each segment defines a geographical terminus point, corresponding to an approximate location that the user can reach within an amount of time associated with the segment. The multi-leg computation component 902 can then shift the geographical terminus point of each segment such that it satisfies one or more additional conditions, some of which may be explicitly specified by the user. For example, the multi-leg computation component 902 can extend a geographical terminus point such that it coincides with a city 10 miles ahead of the terminus point, along a highway being traveled by the user. By doing so, the multi-leg computation component 902 can increase the amenities available to the user in his or her layover.

FIG. 9 also shows a graphical presentation 904 that includes the output results of the multi-leg computation component 902. The graphical presentation 904 shows visual icons (906, 908) that represent the current locations of the first user and the second user. A graphical representation of a fair region 910 defines a collection of meeting locations that are considered fair to both the first user and the second user (with respect to a cost function that defines fair as equal cost expenditure). The graphical presentation 904 also shows a first journey 912 to be completed by the first user, and a second journey 914 to be completed by the second user. Both journeys (912, 914) are broken into three segments specified by the multi-leg computation component 902.

B. Illustrative Processes

Figure 10:
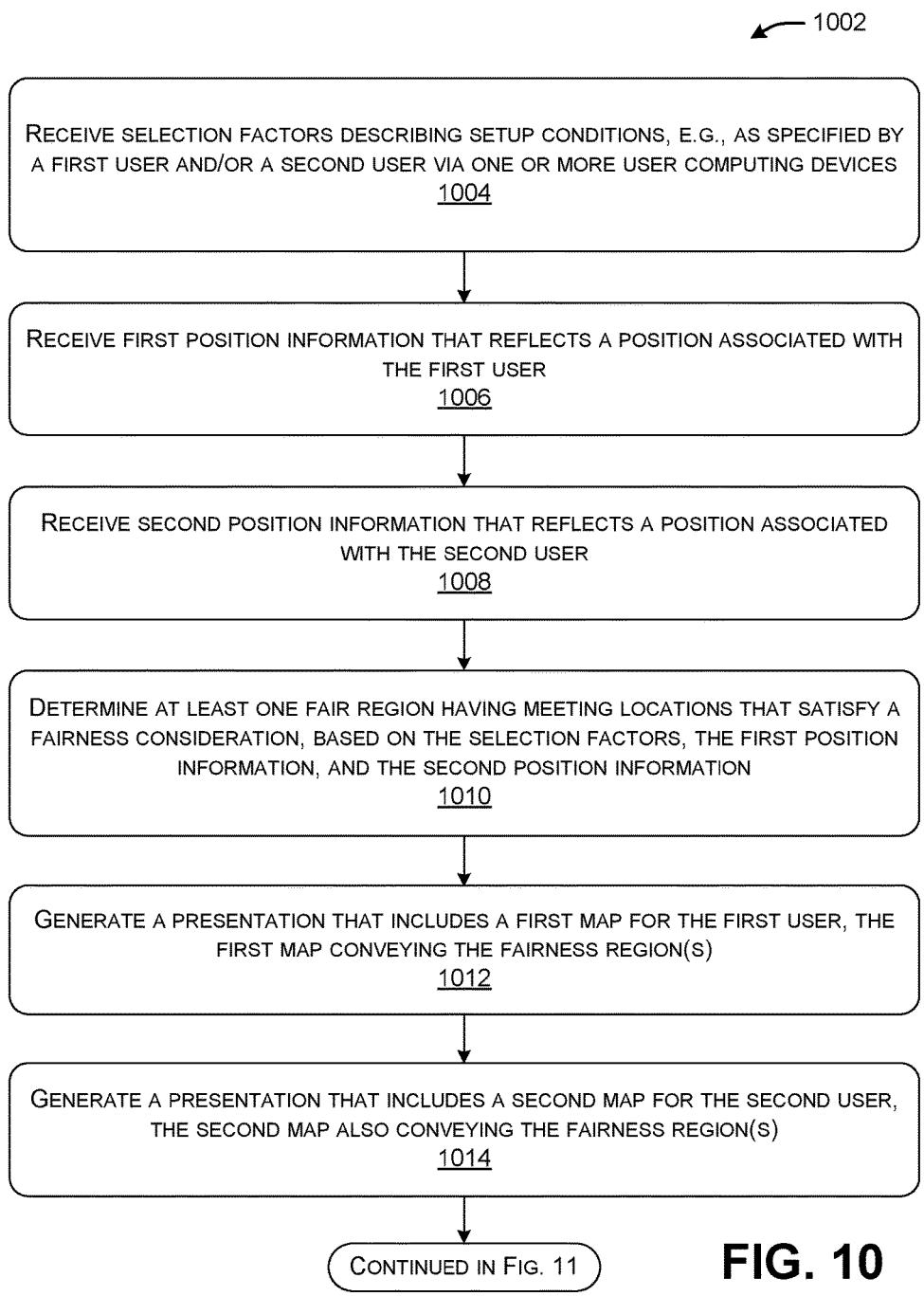
FIGS. 10 and 11 together show a process that describes one manner of operation of the map system of FIG. 1.
Figure 11:
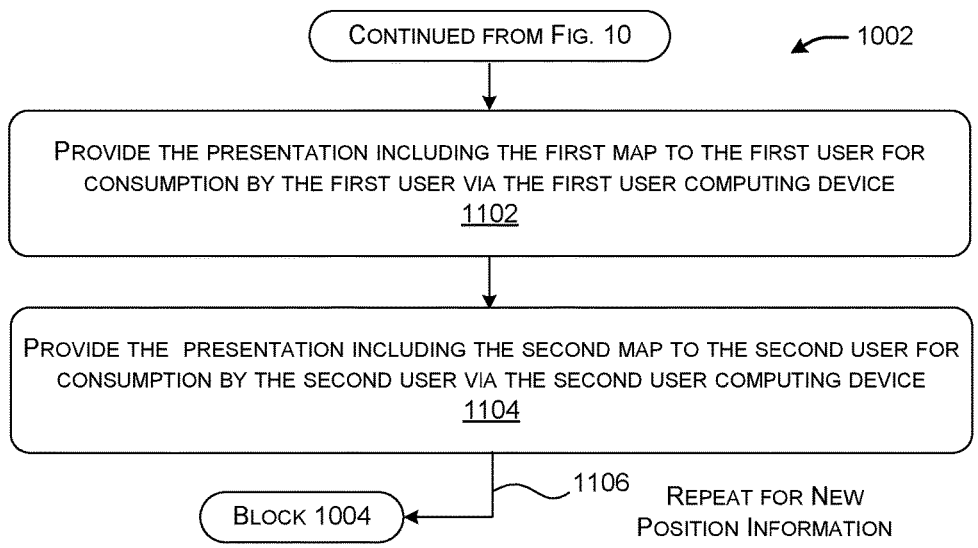

FIGS. 10 and 11 show processes (1002, 1202) that explain the operation of the map system 104 of Section A in flowchart form. Since the principles underlying the operation of the map system 104 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

In block 1004 of FIG. 10, the map system 104 receives selection factors describing setup conditions. In one case, the map system 104 receives the selection factors from a first user and/or a second user, e.g., via the user input devices (110, 116). In another case, the map system 104 receives at least some of the selection factors from an administrative user. In block 1006, the map system 104 receives first position information from a first position determination mechanism 112 that reflects a position associated with the first user. In block 1008, the map system 104 receives second position information from a second position determination mechanism 118 that reflects a position associated with the second user. Alternatively, the first user and/or the second user can manually specify their current positions or intended starting positions, e.g., via the user input devices (110, 116).

In block 1010, the map system 104 determines at least one fair region having meeting locations that satisfy a fairness consideration, based on the selection factors, the first position information, and the second position information. In one example, a meeting location within the fair region(s) satisfies the fairness consideration when both the first user and the second user can travel to (and/or from) the meeting location with an equal amount of cost. In other examples, a different cost function can be selected which defines fairness in any other way. In block 1012, the map system 104 generates a graphical presentation (or other type of presentation) that includes a first map for the first user, the first map conveying the fairness region(s). In block 1014, the map system 104 generates a graphical presentation (or other type of presentation) that includes a second map for the second user, the second map also conveying the fairness region(s).

Advancing to FIG. 11, in block 1102, the map system 104 provides the graphical presentation including the first map to the first user for consumption by the first user via a first user computing device 210. In block 1104, the map system 104 provides the graphical presentation including the second map to the second user for consumption by the second user via a second user computing device 212.

Finally, FIG. 11 shows a feedback loop 1106 which indicates that the map system 104 can optional dynamically update the graphical presentations as the first user and the second user move towards a chosen meeting location.

Figure 12:
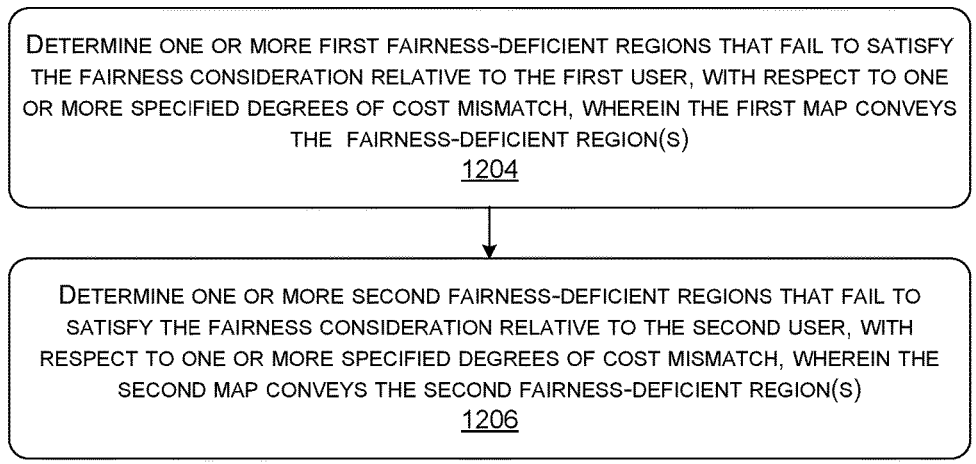
FIG. 12 shows another process that describes another aspect of the operation of the map system of FIG. 1.

In block 1204 of FIG. 12, the map system 104 determines one or more first fairness-deficient regions that fail to satisfy the fairness consideration relative to the first user, with respect to one or more specified degrees of cost mismatch. The first map conveys the first fairness-deficient region(s), along with the fair region(s). In block 1206, the map system 104 determines one or more second fairness-deficient regions that fail to satisfy the fairness consideration relative to the second user, with respect to one or more specified degrees of cost mismatch. The second map conveys the second fairness-deficient region(s), along with the fair region(s).

Generally, with respect to FIGS. 10-12, the map system 104 can designate the region(s) in any of the ways described above, by which the user is generally apprised of the contours of the region(s). For example, the map system 104 can designate a fair region by assigning a background color and/or shading to the fair region, and/or by showing a boundary of the fair region, and/or by showing visual icons which mark candidate meeting locations within the fair region (if plentiful), and so on.

C. Representative Computing Functionality

Figure 13:
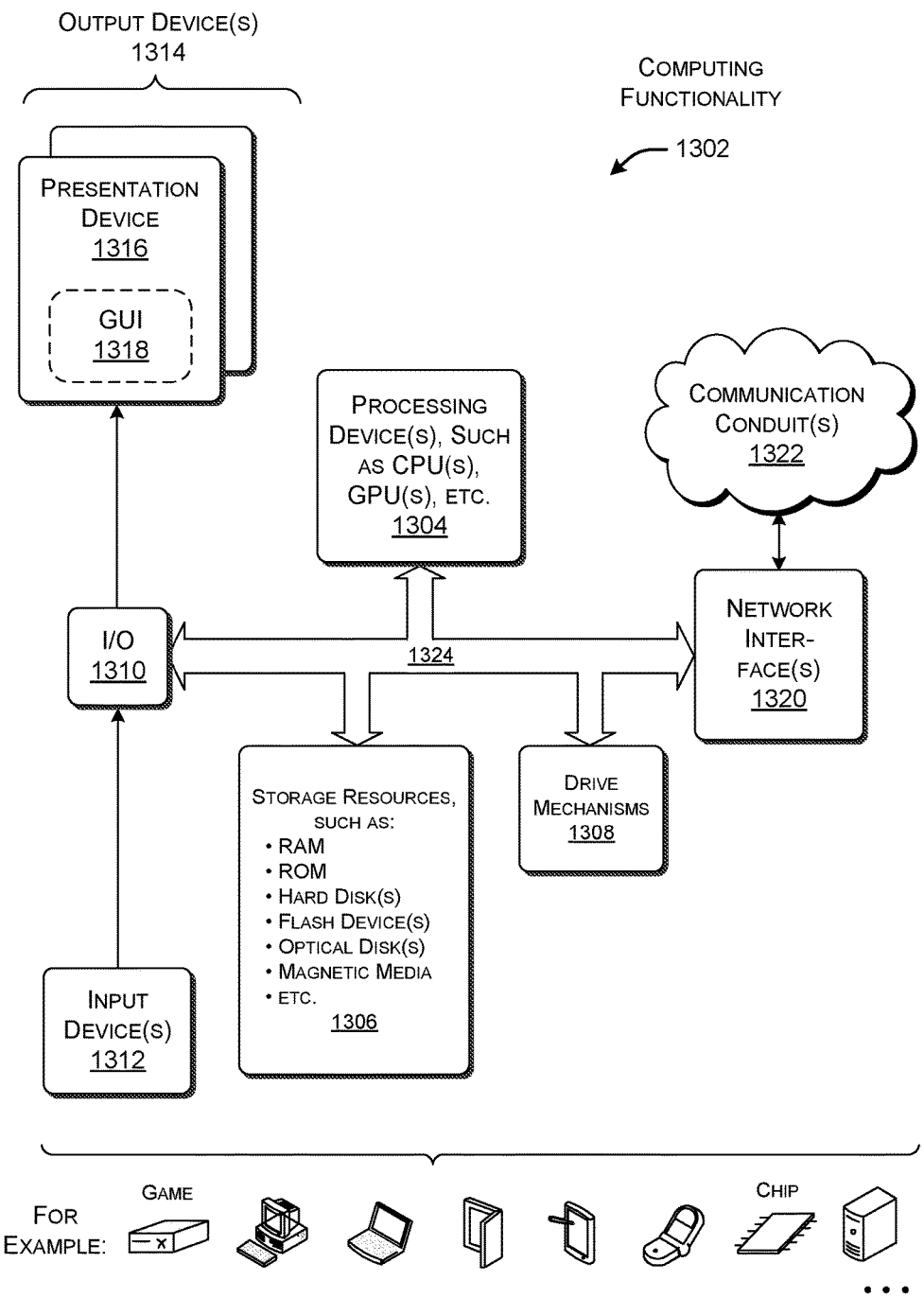
FIG. 13 shows illustrative computing functionality that can be used to implement any aspect of the features shown in the foregoing drawings.

FIG. 13 shows computing functionality 1302 that can be used to implement any aspect of the mechanisms set forth in the above-described figures. For instance, the type of computing functionality 1302 shown in FIG. 13 can be used to implement the remote computing system(s) 204 and each user computing device (210, 212) of FIG. 2. In all cases, the computing functionality 1302 represents one or more physical and tangible processing mechanisms.

The computing functionality 1302 can include one or more hardware processor devices 1304, such as one or more central processing units (CPUs), and/or one or more graphical processing units (GPUs), and so on. The computing functionality 1302 can also include any storage resources (also referred to as computer-readable storage media or computer-readable storage medium devices) 1306 for storing any kind of information, such as machine-readable instructions, settings, data, etc. Without limitation, for instance, the storage resources 1306 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 1302. The computing functionality 1302 may perform any of the functions described above when the hardware processor device(s) 1304 carry out computer-readable instructions stored in any storage resource or combination of storage resources. For instance, the computing functionality 1302 may carry out computer-readable instructions to perform each block of the processes (1002, 1202) described in Section B. The computing functionality 1302 also includes one or more drive mechanisms 1308 for interacting with any storage resource, such as a hard disk drive mechanism, an optical disk drive mechanism, and so on.

The computing functionality 1302 also includes an input/output component 1310 for receiving various inputs (via input devices 1312), and for providing various outputs (via output devices 1314). Illustrative input devices include a keyboard device, a mouse input device, a touchscreen input device, a digitizing pad, one or more static image cameras, one or more video cameras, one or more depth cameras, one or more microphones, a voice recognition mechanism, any movement detection mechanisms (e.g., accelerometers, gyroscopes, etc.), and so on. One particular output mechanism may include a display device 1316 and an associated graphical user interface presentation (GUI) 1318. For instance, the computing functionality 1302 can present the graphical presentations shown in FIGS. 4-9 on the display device 1316. The display device 1316 may correspond to a charge-coupled display device, a cathode ray tube device, a projection mechanism, etc. Other output devices include a printer, one or more speakers, a haptic output mechanism, an archival mechanism (for storing output information), and so on. The computing functionality 1302 can also include one or more network interfaces 1320 for exchanging data with other devices via one or more communication conduits 1322. One or more communication buses 1324 communicatively couple the above-described components together.

The communication conduit(s) 1322 can be implemented in any manner, e.g., by a local area computer network, a wide area computer network (e.g., the Internet), point-to-point connections, etc., or any combination thereof. The communication conduit(s) 1322 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1302 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself.

The following summary provides a non-exhaustive list of illustrative aspects of the technology set forth herein.

According to a first aspect, one or more computing devices are described for assisting users in navigating within a region. The device(s) include an input interface component configured to: receive selection factors describing setup conditions; receive first position information that reflects a position associated with a first user; and receive second position information that reflects a position associated with a second user. The device(s) also include a region determination component configured to determine at least one fair region, if any, having meeting locations that satisfy a fairness consideration, based on the selection factors, the first position information, and the second position information. A meeting location within the fair region(s) satisfies the fairness consideration when both the first user and the second user can travel to and/or from the meeting location with an amount of cost that satisfies a specified cost function. The device(s) also includes a map generation component configured to: generate at least one presentation that includes a map that conveys the fair region(s) determined by the region determination component; and provide the presentation(s) to the first user and/or the second user, for consumption by the first user and/or the second user via at least one user computing device.

According to a second aspect, the region determination component is also configured to determine at least one fairness-deficient region that fails to satisfy the fairness consideration for at least one of the first user and/or the second user, with respect to one or more specified degrees of cost mismatch. The map generation component is also configured to generate the presentation(s) so that the map conveys the fairness-deficient region(s).

According to a third aspect, the map generation component is configured to generate a first map for the first user, and to provide the first map to the first user. The map generation component is configured to generate a second map for the second user, and to provide the second map to the second user. The first map conveys the fair region(s), and one or more first fairness-deficient regions relative to the first user. The second map conveys the fair region(s), and one or more second fairness-deficient region relative to the second user.

According to a fourth aspect, one of the selection factors is a cost factor that specifies a characteristic by which cost is defined. Another one of the selection factors is a cost function factor that specifies the cost function.

According to a fifth aspect, the cost function factor specifies a cost function that indicates that a meeting location satisfies the fairness consideration when both the first user and the second user can travel to and/or from the meeting location with an equal amount of cost.

According to a sixth aspect, one of the selection factors is a mode factor that specifies at least one mode of travel by the first user and at least one mode of travel by the second user.

According to a seventh aspect, one of the selection factors is a destination characteristic factor that specifies a destination characteristic of a meeting location that the first user and the second user intend to visit.

According to an eighth aspect, one of the selection factors is a maximum cost factor which specifies a maximum amount of cost that the first user and the second user are willing to expend to reach a meeting location in the fair region(s).

According to a ninth aspect, one of the selection factors is a geographic range factor which specifies a geographic scope of valid meeting locations.

According to a tenth aspect, one of the selection factors is a journey partition factor that specifies at least one consideration by which a journey by the first user and/or the second user, to a meeting location, is to be broken into plural segments.

According to a eleventh aspect, the map generation component is configured to receive an input signal from the first user and/or the second user, in response to the first user and/or the second user dynamically changing at least one selection factor. The map generation component is configured to dynamically update the presentation(s) in response to the input signal.

According to a twelfth aspect, the device(s) further include an alert component which is configured to: determine that a previously determined meeting location to which the first user and the second user are currently headed no longer meets the fairness consideration; and send an alert to the first user and the second user which notifies the first user and the second user that the previously determined meeting location no longer meets the fairness consideration.

According to a thirteenth aspect, the region determination component includes: a location determination component that is configured to determine a first set of locations that the first user can reach in a prescribed amount of cost, for different respective ranges of cost, and a second set of locations that the second user can reach in a prescribed amount of cost, for different respective ranges of cost; and an intersection component configured to form an intersection of the first set of locations and the second set of locations, to generate the fair region(s).

According to a fourteenth aspect, the region determination component further includes a location filter component that is configured to determine a set of viable candidate locations for consideration by the location determination component.

According to a fifteenth aspect, the region determination component is configured to determine the fair region(s) with respect to three or more people.

According to a sixteenth aspect, the first position information is received from a first position determination mechanism, and the second position information is received from a second position determination mechanism.

According to a seventeenth aspect, the region determination component and the map generation component are configured to dynamically update the presentation(s) as the first user and the second user move towards a chosen meeting location.

According to an eighteenth aspect, a method is described, implemented by one or more computing devices, for assisting users in navigating within a region. The method includes: receiving selection factors describing setup conditions; receiving first position information that reflects a position associated with a first user; receiving second position information that reflects a position associated with a second user; determining at least one fair region having meeting locations that satisfy a fairness consideration, if any, based on the selection factors, the first position information, and the second position information, a meeting location within the fair region(s) satisfying the fairness consideration when both the first user and the second user can travel to and/or from the meeting location with an equal amount of cost; generating a graphical presentation that includes a first map for the first user, the first map depicting the fairness region(s); generating a graphical presentation that includes a second map for the second user, the second map also depicting the fairness region(s); providing the graphical presentation including the first map to the first user for consumption by the first user via a first user computing device; providing the graphical presentation including the second map to the second user for consumption by the second user via a second user computing device; and dynamically updating the graphical presentations as the first user and the second user move towards a chosen meeting location.

According to a nineteenth aspect, the method further includes: determining one or more first fairness-deficient regions that fail to satisfy the fairness consideration relative to the first user, with respect to one or more specified degrees of cost mismatch, and determining one or more second fairness-deficient regions that fail to satisfy the fairness consideration relative to the second user, with respect to one or more specified degrees of cost mismatch. The first map also shows the first fairness-deficient region(s), and the second map also shows the second fairness-deficient region (s).

According to a twentieth aspect, a computer-readable storage medium is described for storing computer-readable instructions, the computer-readable instructions, when executed by one or more processor devices, performing a method. The method includes: receiving selection factors that describe setup conditions; receiving first position information that reflects a position associated with a first user; receiving second position information that reflects a position associated with a second user; determining at least one fair region having meeting locations that satisfy a fairness consideration, if any, based on the selection factors, the first position information, and the second position information, a meeting location within the fair region(s) satisfying the fairness consideration when both the first user and the second user can travel to and/or from the meeting location with an equal amount of cost; determining one or more first fairness-deficient regions that fail to satisfy the fairness consideration relative to the first user, with respect to one or more specified degrees of cost mismatch; determining one or more second fairness-deficient regions that fail to satisfy the fairness consideration relative to the second user, with respect to one or more specified degrees of cost mismatch; generating a graphical presentation that includes a first map for consumption by the first user via a first user computing device, the first map depicting the fairness region(s) and the first fairness-deficient region(s); and generating a graphical presentation that includes a second map for consumption by the second user via a second user computing device, the second map depicting the fairness region(s) and the second fairness-deficient region(s).

A twenty-first aspect corresponds to any combination (e.g., any permutation or subset that is not logically inconsistent) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A system, comprising:
one or more hardware processor devices;
at least one computer-readable storage medium storing computer-readable instructions which, when executed by the one or more hardware processor devices, cause the one or more hardware processor devices to:
receive selection factors;
receive a first device position of a first device associated with a first user;
receive a second device position of a second device associated with a second user;
determine a first fair region that satisfies a fairness consideration and a first range of cost based at least on the selection factors, the first device position, and the second device position;
determine a second fair region that satisfies the fairness consideration and a second range of cost based at least on the selection factors, the first device position, and the second device position;

determine a meeting location within the first fair region that would satisfy the fairness consideration when the first user were to travel between the first device position and the meeting location and the second user were to travel between the second device position and the meeting location;

generate at least one presentation that includes a map that includes a heat map that conveys the first fair region and the second fair region; and provide the at least one presentation to the first user or the second user.

2. The system of claim 1, wherein the computer-readable instructions, when executed by the one or more hardware processor devices, cause the one or more hardware processor devices to:

determine at least one fairness-deficient region that fails to satisfy the fairness consideration for at least one of the first user and the second user; and including the at least one fairness-deficient region in the map.

3. The system of claim 2, wherein the computer-readable instructions, when executed by the one or more hardware processor devices, cause the one or more hardware processor devices to:

generate a first map that includes a first heat map that conveys the first fair region, the second fair region, and one or more first fairness-deficient regions relative to the first user; and provide the first map to the first user.

4. The system of claim 1, wherein the selection factors include a cost factor that specifies a characteristic by which cost is defined and a cost function factor that specifies a cost function.

5. The system of claim 4, wherein the cost function indicates that the meeting location satisfies the fairness consideration based at least on a degree of cost mismatch with respect to the first user and the second user.

6. The system of claim 1, wherein the selection factors include a first mode factor that specifies at least one mode of travel associated with the first user and a second mode factor that specifies at least one mode of travel associated with the second user.

7. The system of claim 1, wherein the selection factors include a destination characteristic factor that specifies a destination characteristic of the meeting location.

8. The system of claim 1, wherein the selection factors include a maximum cost factor which specifies a maximum amount of cost that the first user is willing to expend to travel to the meeting location.

9. The system of claim 1, wherein the selection factors include a geographic range factor which specifies a geographic scope of valid meeting locations.

10. The system of claim 1, wherein the selection factors include a journey partition factor that specifies at least one consideration by which a journey by the first user to the meeting location is to be broken into plural segments.

11. The system of claim 1, wherein the computer-readable instructions, when executed by the one or more hardware processor devices, cause the one or more hardware processor devices to:

receive an input signal from the first user in response to the first user dynamically changing at least one selection factor: and dynamically update the at least one presentation in response to the input signal.

12. The system of claim 1, wherein the computer-readable instructions, when executed by the one or more hardware processor devices, cause the one or more hardware processor devices to:

determine that the meeting location to which the first user and the second user are currently headed no longer meets the fairness consideration; and send an alert to the first user and the second user which notifies the first user and the second user that the meeting location no longer meets the fairness consideration.

13. The system of claim 1, wherein the computer-readable instructions, when executed by the one or more hardware processor devices, cause the one or more hardware processor devices to:

determine first sets of locations that the first user can reach for different respective ranges of cost;

determine second sets of locations that the second user can reach for different respective ranges of cost; and form an intersection of the first sets of locations and the second sets of locations to generate the first fair region and the second fair region.

14. The system of claim 13, wherein the computer-readable instructions, when executed by the one or more hardware processor devices, cause the one or more hardware processor devices to:

determine a set of viable candidate locations from which the meeting location is selected.

15. The system of claim 1, wherein the computer-readable instructions, when executed by the one or more hardware processor devices, cause the one or more hardware processor devices to:

determine the first fair region and the second fair region with respect to three or more users.

16. The system of claim 1, further comprising:

a position determination mechanism for determining the first device position.

17. The system of claim 1, wherein the computer-readable instructions, when executed by the one or more hardware processor devices, cause the one or more hardware processor devices to:

dynamically update the at least one presentation as at least one of the first device and the second device moves towards the meeting location.

18. A method implemented by one or more computing devices, the method comprising:

receiving selection factors;

receiving a first device position of a first device associated with a first user;

receiving a second device position of a second device associated with a second user;

determining a first fair region that satisfies a fairness consideration and a first range of cost based at least on the selection factors, the first device position, and the second device position;

determining a second fair region that satisfies the fairness consideration and a second range of cost based at least on the selection factors, the first device position, and the second device position;

determining a meeting location within the first fair region that satisfies the fairness consideration when the first user and the second user travel to and/or from the meeting location;

generating a graphical presentation that includes a map that includes a heat map depicting the first fair region and the second fair region;

providing the graphical presentation to the first user; and dynamically updating the graphical presentation as at least one of the first device and the second device moves towards the meeting location.

19. The method of claim 18, further comprising:

determining one or more fairness-deficient regions that fail to satisfy the fairness consideration relative to the first user based at least on a degree of cost mismatch with respect to the first user and the second user; and including a depiction of the one or more fairness-deficient regions in the heat map.

20. A computer-readable storage medium storing computer-readable instructions which, when executed by one or more hardware processor devices, cause the one or more hardware processor devices to:

receive selection factors;

receive a first device position of a first device associated with a first user;

receive a second device position of a second device associated with a second user;

determining a first fair region that satisfies a fairness consideration and a first range of cost based at least on the selection factors, the first device position, and the second device position;

determining a second fair region that satisfies the fairness consideration and a second range of cost based at least on the selection factors, the first device position, and the second device position;

determining a meeting location within the first fair region satisfying the fairness consideration when the first user and the second user travel between the meeting location and the first device position and the second device position, respectively;

determining one or more first fairness-deficient regions that fail to satisfy the fairness consideration relative to the first user;

determining one or more second fairness-deficient regions that fail to satisfy the fairness consideration relative to the second user;

generating a first graphical presentation that includes a first map for consumption by the first user, the first map including a first heat map depicting the first fair region, the second fair region, and the one or more first fairness-deficient regions; and generating a second graphical presentation that includes a second map for consumption by the second user, the second map including a second heat map depicting the first fair region, the second fair region, and the one or more second fairness-deficient regions.

* * * * *